(12) United States Patent
Fattouch et al.

(10) Patent No.: US 7,020,470 B2
(45) Date of Patent: Mar. 28, 2006

(54) PROCESS AND SYSTEM FOR CREATING, ADMINISTERING AND OPERATING DISTRIBUTION MAPS OF TRAFFIC ON A RADIOCOMMUNICATIONS NETWORK

(75) Inventors: Imad Fattouch, Paris (FR); Stéphane Parniere, Saint Germain en Laye (FR); François Vincent, Clamart (FR)

(73) Assignee: Societte Francaise Du Radiotelephone, Paris la Defense (FR)

( * ) Notice: Subject to any disclaimer, the term of this patent is extended or adjusted under 35 U.S.C. 154(b) by 209 days.

(21) Appl. No.: 10/736,762

(22) Filed: Dec. 16, 2003

(65) Prior Publication Data

US 2004/0185858 A1  Sep. 23, 2004

(30) Foreign Application Priority Data

Dec. 26, 2002 (FR) .................................. 02 16860

(51) Int. Cl.
*H04Q 7/20* (2006.01)

(52) U.S. Cl. .................... 455/446; 455/428; 455/422.1

(58) Field of Classification Search ................ 455/446, 455/448, 449, 452.1, 452.2, 453, 63.2, 525, 455/428, 422.1, 435; 370/229, 230, 329, 370/331
See application file for complete search history.

(56) References Cited

U.S. PATENT DOCUMENTS

| | | | | |
|---|---|---|---|---|
| 5,131,020 A | * | 7/1992 | Liebesny et al. ........ 455/414.3 |
| 5,247,699 A | * | 9/1993 | Hartman ...................... 455/447 |
| 5,293,640 A | | 3/1994 | Gunmar et al. ............. 455/33.1 |
| 5,561,839 A | * | 10/1996 | Osterberg et al. ........... 455/446 |
| 6,128,497 A | * | 10/2000 | Faruque ...................... 455/447 |
| 6,205,335 B1 | * | 3/2001 | Furusawa et al. ........... 455/436 |
| 6,493,561 B1 | * | 12/2002 | Hasegawa ................... 455/512 |
| 6,539,221 B1 | * | 3/2003 | Vasudevan et al. ......... 455/423 |
| 6,636,739 B1 | * | 10/2003 | Fagen et al. ................ 455/453 |
| 6,909,902 B1 | * | 6/2005 | Sawada et al. .......... 455/456.1 |
| 6,915,139 B1 | * | 7/2005 | Hamabe ..................... 455/522 |
| 2004/0192375 A1 | * | 9/2004 | Cho et al. ................ 455/550.1 |

FOREIGN PATENT DOCUMENTS

WO   WO 00/36863   6/2000

* cited by examiner

*Primary Examiner*—CongVan Tran
(74) *Attorney, Agent, or Firm*—Perman & Green, LLP.

(57) ABSTRACT

The process for creating, administering and operating distribution maps of the radiocommunications traffic is executed by means of an information system storing data representative of geographical maps cut up into pixels according to the way the network is cut up, and data representative of the traffic in the network. A geographical zone is selected by interactive means between the user and the system and the traffic data corresponding to the zone are recovered and utilized to form at least one distribution map of the circuit traffic. The system calculates the traffic to flow at any point on the map by taking into account progress coefficients as a function of geomarketing data. The system also calculates the capacity of the network for traffic flow at any point. The sub-zones either under-sized or over-sized relative to the traffic can thus be defined.

21 Claims, 2 Drawing Sheets

PROCESS AND SYSTEM FOR CREATING, ADMINISTERING AND OPERATING DISTRIBUTION MAPS OF TRAFFIC ON A RADIOCOMMUNICATIONS NETWORK

The present invention relates to cellular radiotelephone networks, and more particularly, for improvement in radio coverage in a network administered by an operator, a process and a system for creating, administering and operating traffic distribution maps on a radiocommunications network, such as GSM circuit traffic.

A cellular telephone network is constituted by a plurality of terrestrial radioelectric base stations, which ensure radio coverage of zones defining the respective cells. To be able to establish communications between the mobile radio terminals circulating in the zone of a cell and the station, the station needs an available circuit. For this purpose the radio network must be of an appropriate size.

In a known manner, building a radio access network to size, for example GSM, UMTS or any other radio network, comprises:
  on the one hand, estimating the number and configuration of the different network elements necessary for supplying a mobile service in a given region (on a national or regional scale, for example), deployment in several phases, generally over several years,
  and on the other hand, proposing a typology of radio access network.

Irrespective of the phase of the deployment plan, the starting data are of three kinds: coverage data, traffic data and service quality data. The coverage data correspond to the regions to be covered, each region being divided into zones, which must be identified (for example into four categories: dense urban, urban, suburban, rural). The propagation conditions can be deduced from the coverage data. The traffic data correspond to the availability of the frequency range, to the density of subscribers per zone (for example 500 subscribers per $km^2$) and to the subscriber consumption profile. Finally, the data relating to the service quality correspond on the one hand to coverage probabilities (for example 95% probability that the intensity of the signal received is over a certain threshold), blockage probabilities, maximum delay, minimum rate, and on the other hand to service levels envisaged for the different zones.

A disadvantage of the sizing methods of the prior art is that the mobility of the subscribers is not truly taken into account. The traffic data at best inform only of a static density of subscribers in a zone. However, the sizing could be facilitated and better adapted if it could take into consideration the subscriber traffic for each specific site in a region to be covered, by also taking into account the disparities within the same zone.

The first object of the present invention is to eliminate one or more of the disadvantages of the prior art by defining a process for creating, administering and operating traffic distribution maps of the mobile telecommunications circuits which allows, by taking into account statistics of traffic measured for radio sizing, an information map representative of the evolutions and disparities in traffic to be provided for a radio network.

Another object of the invention is to allow optimum deployment or modification of the radio coverage of the network, by exploiting these data representative of an information map on real traffic.

To this end, the invention relates to a process for creating, administering and operating traffic distribution maps of a mobile radiocommunications network, for deployment of radio coverage of a cellular telephone network, using an information system storing data representative of geographical zones cut up into a plurality of points or pixels according to the cutting of said network, of the data representative of the traffic in the radiocommunications network of subscribers to said network, characterised in that said data representative of the traffic in the radiocommunications network comprise quantitative and qualitative measurements of the traffic of the subscribers on the network, said measurements corresponding to at least one set time slot, said process comprising the following stages:
  selection of at least one geographic zone by interactive means between the user and said system,
  recovery and utilisation by said system of data representative of the traffic corresponding to said selected geographical zone and to a set time slot to form, by operating these data by the information system, at least one traffic distribution map of the radiocommunications network.

According to another particular feature of the invention, the data representative of the traffic in the radiocommunications network comprise data provided by counting means and extracted from at least one supervision centre of equipments by extraction and tabling means of said information system.

According to another particular feature of the invention, each geographical zone stored in the information system corresponds to a plurality of series of quantitative and qualitative measurements of the traffic, each series of measurements corresponding to a different time slot, the sequencing of said series of measurements as a function of the geographical zones and the time slots being carried out by said extraction and tabling means in respective specific tables stored in a memory of the information system.

According to another particular feature, said data representative of the traffic comprises availability of the frequency range for each geographical zone, said quantitative and qualitative measurements of the traffic of subscribers comprising especially, for each geographical zone, for a set time slot:
  the average density of the traffic flow at any point in the zone,
  the access blockage rate to the network at any point in said zone.

The invention thus takes into account data truly representative of the traffic requirements within the current network since the actual traffic flow as well as blockages is taken into consideration.

According to another particular feature, said quantitative and qualitative measurements of the subscriber traffic further comprise, for each geographical zone, for a set time slot, the number of call starts at any point in the zone.

According to another particular feature, said information system calculates a level of value of the subscriber traffic at any point of the selected geographic zone, said traffic value level being expressed in a unit of traffic representative of the occupancy rate of radio resources, the pixels being represented differently in said zone according to the level of value of the traffic flow for the pixel. The unit of traffic can be expressed in milliErianglkm² ($mE/km^2$), for the circuit traffic and in megaoctets/hertz/$km^2$ for data traffic.

According to another particular feature, a distribution map of the traffic of the radiocommunications network stored by said information system is coupled, in response to a selection made by interactive means between the user and said system, to a first database stored in said system which comprises data representative of the estimated progress of the traffic inside each of the pixels, said system selecting in said first database the data corresponding to said traffic distribution map selected to calculate, by calculation means of said system, the traffic to flow inside each of the pixels.

According to another particular feature, data representative of the estimated progress of the traffic correspond, for each pixel, to a weighting function especially of service probabilities associated with the field level in the network, and the type of ground station, the information system having an effect on and storing this weighting for each pixel.

According to another particular feature, a traffic distribution map of the radiocommunications network stored by said information system is coupled. In response to a selection made by interactive means between the user and said system, to a second database stored in said system which comprises geomarketing data representative of geographic maps for weighting pixels combined in contours, the weighting coefficient within the contours depending especially on service probabilities, functions of the field level in the network, and the type of ground station.

According to another particular feature, a map of the traffic to flow is generated by said calculation means from operating and coupling data of said distribution map of the traffic with the traffic progress data stored in a database of storage means.

According to another particular feature, a modelling phase of the radio coverage is parametered using data stored in the system, representative of at least one type of radio station and comprises the following stages which apply to the previously selected geographical zone:
  selection of data and parameters for determining the zone of radio coverage corresponding in a coverage file of the storage means of said system, said parameters comprising a coverage calculation step,
  meshing on said geographical zone, selected from the coverage cells associated with said zone of radio coverage, so as to determine the traffic capacity within each cell.

According to another particular feature, an identification stage of sub-zones to be compacted is undertaken by the calculation means of said information system as a result of the modelling phase of the radio coverage, by comparison for each pixel between the traffic data to flow and the data representative of the traffic capacity.

According to another particular feature, an identification stage of network sub-zones to be compacted is undertaken by the calculation means of said information system as a result of the modelling phase of the radio coverage, by comparison for each contour between the traffic to flow and the traffic capacity, with the difference between traffic to flow and traffic capacity exceeding a set threshold inside said sub-zones.

According to another particular feature, an identification stage of sub-zones with surplus capacity is undertaken by the calculation means of said information system as a result of the modelling phase of the radio coverage, by comparison for each pixel between the traffic to flow and the traffic capacity.

According to another particular feature, the difference between traffic flow and traffic capacity in a sub-zone is reduced by adjustment, addition or omission by the user of at least one piece of send/receive equipment situated in the most active cell, said main server, for said sub-zone, triggering a reconfiguration of the modelling of the network on the information system (1) and storage of the corresponding modification.

Another object of the invention is to provide a solution to one or more of the problems encountered in the prior art by defining an information system, specially adapted to the process according to the invention, to improve radio coverage of a cellular telephone network.

This object is achieved with an information system for implementing the process according to the invention, comprising storage means, selection means and calculation means, said storage means comprising in a first memory data representative of geographical zones cut up into a plurality of points or pixels according to the way said network is cut up and in a second memory data representative of the traffic of a radiocommunications network with at least one set time slot for said network, said system being characterised in that it comprises:
  interactive means between the user and said system, connected to the selection means for selecting and displaying at least one of said geographical zones,
  superposition means on said selected geographical zone of data representative of the traffic with a set time slot for forming at least one traffic distribution map, displayed by said interactive means,
  extraction and tabling means, from data provided by counter means and extracted from at least one supervision centre for equipment, series of measurements as a function of the geographical zones and the time slots.

According to another particular feature of the invention, said data representative of the traffic comprise the availability of the frequency range, quantitative and qualitative measurements of subscriber traffic, said measurements including:
  the average density of the traffic at any point of the zone,
  the rate of access blockage to the network at any point of said zone,
  the number of call starts at any point of the zone.

According to another particular feature, said calculation means are connected to the storage means for calculating, from said data representative of the traffic, the value of the traffic flow at any point in a geographical zone selected by said selection means.

According to another particular feature, said storage means comprise memories for storing respectively at least one file containing geomarketing data, at least one file containing data for determining the radio coverage of the network, at least one file of data representative of the estimated progress of the traffic at any point or pixel of the network, and at least one configuration file comprising entry parameters acquired by the user by means of said interactive means, said geomarketing data comprising weighting elements of each of the pixels, especially service probabilities, functions of the field level in the network, and different types of ground station.

According to another particular feature of the invention, said calculation means are connected to extraction means of the data of the file of marketing data and/or of the file of progress data on the traffic for calculating at any point of said selected zone the value of the traffic to flow, the values of all traffic to flow of the selected zone being stored in said storage means.

According to another particular feature, said data for determining the radio coverage of the network comprise data representative of at least one type of station radio, said selection means selecting those data representative of zones of radio coverage and said entry parameters corresponding to the zone selected to allow the calculation means to provide the traffic capacity at any point in said zone.

According to another particular feature, said calculation means comprise a comparison module of the values between the traffic to flow and the traffic capacity, at any point in a zone selected by said selection means, allowing determination of network sub-zones to be compacted.

According to another particular feature, said entry parameters acquired by means of a user/system interface of the interactive means comprise especially a step of coverage calculation.

The invention, with its characteristics and advantages, will become readily apparent from the description made in reference to the attached diagrams given by way of non-limiting example, in which.

The process according to the invention is used in the setting-up phase of the target radio network in a geographical zone and enables different traffic maps to be created. The process according to the invention consists especially of utilising the traffic information obtained with the existing network for providing judicious deployment of radio coverage.

Figure 1:
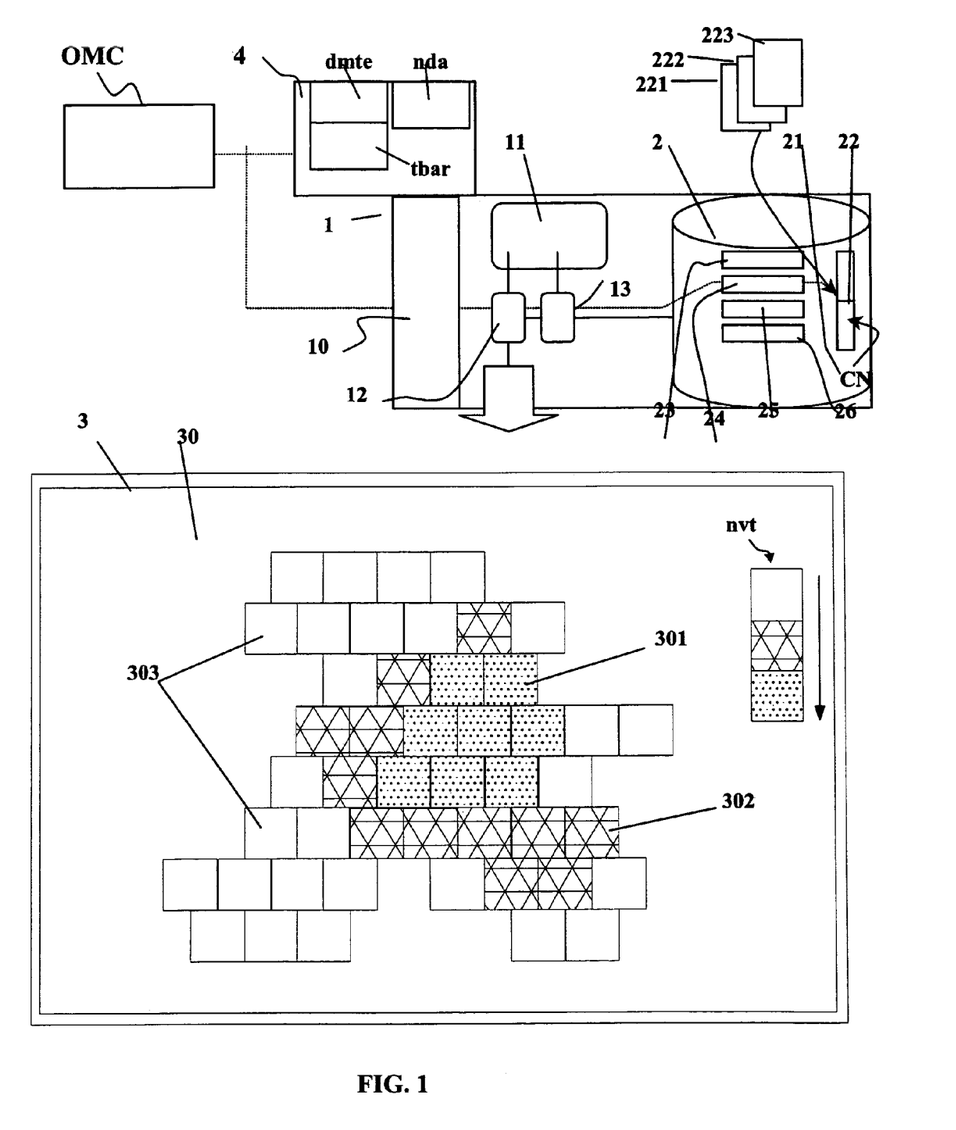
FIG. 1 diagrammatically illustrates the information system according to the invention and a geographical map showing distribution of the traffic obtained by the inventive process.

FIG. 1 shows, on an interactive device (3) for acquiring and display of an information system (1), a graphical representation of a distribution map (30) of the radiocommunications circuit traffic in a geographical zone for which the target network is in the process of definition. The map (30) graphically represents superposition of data between on the one hand the first data of a numerical map (CN), stored in a database (21) of storage means (2) of the information system (1), and on the other hand the data representative of the radiocommunications circuit traffic of subscribers to the network, stored in another database (22) of storage means (2). The processing or calculation means (11), or central unit, the storage means (2), as well as the acquisition means by a keyboard with mouse or other device and presentation of data by an interactive display screen (3), have not been shown in detail.

The first numerical data aid in specifying cutting up of the geographical zone into a plurality of points or pixels according to the way the network is cut up. The process put into use in the invention requires concrete analysis of the existing current traffic in order to reliably estimate the traffic needs inside the radio network already in place. Analysis of the existing network identifies the problems encountered on the radio coverage of a studied geographical zone. The so-called target network to be defined must take this analysis into account to eliminate the majority or all of these problems. For this purpose, the data representative of the radiocommunications circuit traffic comprise data supplied by counter means (4) and extracted from at least one supervision centre of equipment (OMC) by extraction means (10) and tabling means operated by the information system (1). These extracted data can consist of means measuring the traffic or can be several series of quantitative and qualitative measurements of the traffic, distributed over different points of the geographical zone under study. Each series of measurements corresponds for example to a different time slot for the same region. In an embodiment of the invention, the extraction and tabling means (10) enable the measurements to be classed as a function of geographical maps and time slots. In the non-limiting example of a GSM network, the specific measure of the traffic is at the level of the cell.

In an embodiment of the invention, data on current traffic are provided by counter means (4) of APIC type (Analysis of Performance from indicators and Counters). These counter means (4) allow the counters of the supervision centres (OMC) to be stored over several weeks and can supply complex indicators from the evolution of these counters. A tool of APIC type for example enables extraction of the counters of the different supervision centres (OMC) to be consolidated at the national level. The measurements are for example mean values calculated from measurements taken at any point or pixel in a week and can be combined into a database (22) of storage means (2) in the form of files or traffic tables (221, 222, 223). One of the traffic files (221) corresponds for example to the peak-time traffic of the we k, another file (222) corresponds to the daily traffic, and a final file (223) corresponds to the average traffic over four weeks. Each of these files can contain all the cell pixels of the national network. The numerical map (CN) corresponds, in a variant embodiment, to the national geographical map. This numerical map (CN) can be subdivided into a plurality of maps of districts, where the user simply has to initially select the desired district using the interface device (3). Other types of slicing up the map can naturally be envisaged.

A distribution map (30) of the radiocommunications circuit traffic can thus be compiled by means of the information system (1) according to the present invention, by calculating (52) at any geographical point of the distribution of the radiocommunications traffic, then illustration at this point on the map of the values obtained. The calculation means (11) are connected to is the storage means (2) of the system (1) to utilise the data representative of the traffic extracted from the counter means (4) and to calculate the value of the traffic flow at any geographical point of the selected map. At least one of the traffic files is selected by selection means (12) coupled to the interactive acquisition/display device (3) and actioned by the user, then the file data are linked to the information of the numbered geographical map which is likewise selected by the user, in similar fashion. The information system (1) comprises for example superposition means of the data of the map numerical (CN) and the traffic data to form the traffic distribution map (30). A resolution pitch, which can be between 5 and 500 metres, is re-entered as a parameter by a selection or acquisition action of the user by means of the interactive device (3), in a configuration file (25) stored in the storage means (2). As illustrated in FIG. 1, this traffic distribution map (30) is displayed by the interactive device (3) and represents pixels (301, 302, 303) representative of the current traffic. In the embodiment in FIG. 1, the pixels (301, 302, 303) link an identification colour or a graphic screen or similar as a function of each level of traffic value (nvt), expressed in $mE/km^2$ or equivalent unit of traffic representative of the line occupancy of radio resource. For example, the pixels (301) corresponding to traffic between 10000 and 30000 $mE/km^2$ are depicted in a warm hue on a dark screen, the pixels (302) corresponding to less traffic greater than 500 $mE/km^2$ are depicted in a light warm colour and the low-traffic pixels (303) are depicted by another colour in a non-limiting manner, much tighter graduation of the levels of traffic value (nvt) is preferably intended to enable better analysis of the network.

The resulting traffic distribution map (30) offers the advantage of being independent of the system or the radiocommunications infrastructure utilised and the corresponding cellular network, thus allowing traffic to be effectively previewed during a system change.

In a variant embodiment of the invention, the data representative of the radiocommunications circuit traffic in particular comprise the availability of the frequency range for each point of a geographical map. In an embodiment of the invention the quantitative and qualitative measurements of subscriber traffic, originating from the counter means (4) shown in FIG. 1, comprise the average density of the traffic flow (dmte) at any point of the map and the access blockage rate to the network (tbar) at any point on said map. Accordingly, for each geographical zone, and for a set time slot, the traffic currently required can be estimated. In fact, the traffic currently required stems from these measurements since K is calculated as follows:

Traffic currently required=Traffic flow×(1+blockage/2 rate)

Similarly, said quantitative and qualitative traffic measurements can also comprise the number of call starts (nda) at any point on the map. In the process according to the invention the traffic currently required can thus serve as a base for then estimating the target traffic to flow, within the scope of the set-up phase of the target radio network. In a variant, the traffic, measured can simply be data traffic or a combination of the circuit traffic and of the data traffic.

Advantageously, the process according to the invention aids in estimating the target traffic to flow from information originating from the ground, such as the abovementioned measurements. The dimensioning of the target network can for example be calculated with an anticipation time of several months. To likewise anticipate the corresponding evolution of traffic, a coefficient multiplier hereinbelow referred to as traffic progress coefficient is determined and utilised to weight the level of value of the pixels. In a first embodiment of the invention, a distribution map (30) of the radiocommunications circuit traffic, corresponding for example to a department, can be stored in the storage means (2) by said information system (1). This distribution map (30) can then be coupled, in response to a selection made using the interactive device (3), to a first database stored in said system (1), which comprises data representative of the estimated progress of the traffic inside each of the pixels. The selection means (12) of the system (1) enable recovery (51) data from the data in said first database. These data correspond to the traffic distribution map selected for calculating, using the calculation means (111) of said system (1), the traffic to flow inside each of the pixels. The data representative of the estimated progress coefficient of the traffic correspond to a weighting function especially of service probabilities connected to the field level in the network and of the type of ground station. After it has performed weighting for all the pixels of the map selected the information system (1) stores the new levels of traffic value (nvt) for each of the pixels. The system can optionally take into account a coverage probability between cells.

The weighting due to the ground station aids in taking into consideration the real distribution of traffic, which varies according to the class of ground station and optionally the type of circulation axis. This weighting is for example obtained from a file stored in the storage means (2), which are in the form of a weighting matrix, as illustrated below.

| Type of ground station | No information | Water | Mineral surface | Open space | Forest | Urban <10 inhab/ km² | Urban <50 inhab/ km² | Urban <100 inhab/ km² | Urban <200 inhab/ km² |
|---|---|---|---|---|---|---|---|---|---|
| Class of ground station | 0 | 1 | 2 | 3 | 4 | 5 | 6 | 7 | 8 |
| No axis | 0 | 1 | 1 | 1 | 1 | 5 | 5 | 5 | 8 |
| Freeways | 0 | 10 | 10 | 10 | 10 | 20 | 20 | 20 | 20 |
| National roads | 0 | 4 | 4 | 4 | 4 | 10 | 10 | 10 | 16 |
| Railways | 0 | 4 | 4 | 4 | 4 | 8 | 8 | 10 | 15 |
| District Roads | 0 | 3 | 3 | 3 | 3 | 8 | 8 | 10 | 15 |
| Local roads | 0 | 2 | 2 | 2 | 2 | 8 | 8 | 10 | 15 |
| Main roads | 0 | 1 | 1 | 1 | 1 | 5 | 5 | 5 | 8 |
| Side streets | 0 | 1 | 1 | 1 | 1 | 5 | 5 | 5 | 8 |

| Type of ground station | Urban <300 inhab/ km² | Urban <400 inhab/ km² | Urban <500 inhab/ km² | Urban <600 inhab/ km² | Urban <800 inhab/ km² | Urban <1000 inhab/ km² | Urban >1000 inhab/ km² |
|---|---|---|---|---|---|---|---|
| Class of ground station | 9 | 10 | 11 | 12 | 13 | 14 | 15 |
| No axis | 8 | 10 | 10 | 10 | 10 | 10 | 10 |
| Freeways | 20 | 20 | 25 | 25 | 25 | 25 | 25 |
| National roads | 16 | 16 | 16 | 20 | 20 | 20 | 20 |
| Railways | 15 | 15 | 15 | 20 | 20 | 20 | 20 |
| District Roads | 15 | 15 | 15 | 18 | 18 | 18 | 18 |
| Local roads | 15 | 15 | 15 | 18 | 18 | 18 | 18 |

-continued

|            |   |     |    |    |    |    |    |
|------------|---|-----|----|----|----|----|----|
| Main roads | 8 | 10_ | 12 | 15 | 15 | 15 | 15 |
| Side streets | 8 | 10 | 12 | 15 | 15 | 15 | 15 |

In a second embodiment of the invention, a radiocommunications traffic distribution map circuit stored in the form of a file by said information system (1) is coupled to a second database of said system (1) which comprises geomarketing date representative of geographical marketing maps for weighting pixels (301, 302, 303) combined into contours, where the weighting within the contours depends especially on service probabilities, functions of the field level in the network, and the type of ground station. In variant embodiments the numerical map (CN) specifies especially the natural and artificial relief, as well as their nature, such as forest, buildings and other, which allows an estimation of the radio attenuation of the link affected by the relief to be calculated. The calculation means (11) can be linked to extraction and selection means (13) of data from the file (23) of marketing data and/or from the file (24) of traffic progress data, by intervention of the user on an interface, to calculate at any point of said selected map the value of traffic to flow. In an embodiment of the invention, the traffic progress coefficients are especially functions of marketing data, optionally parametrable by the user by way of an interactive interface with the information system (1), stored in the marketing file (23) of the storage means (2) of the information system (1). All of the traffic to flow values of the selected map can be stored in the traffic database (22) of said storage means (2).

According to a preferred embodiment, the functioning of the invention requires the previous acquisition of a large number of entry parameters in the configuration file (25). This so that the information system (1) takes into account certain files stored in the storage means (2). Therefore, parameters such as the name of the file relating to the subdivision into department of the numerical map (CN), the name of the file relating to the marketing specifications, the name of the traffic file, the name and optionally the path of the reference coverage file, must be acquired. In a variant embodiment, several traces of contours delimiting zones defined by class of marketing can be linked to the traffic distribution map. In these contours, all the cells belong to the same class of marketing. The operator fixes for example usage of the interactive device (3) of the system (1) by different values of target field level, which allow differentiation between levels of requirement between contour marketing classes. According to the type of contour containing a pixel, the weighting will be more or less increased. In an embodiment of the invention, the availability of the frequency range can constitute a supplementary parameter of the configuration file.

The table below illustrates a possibility for classification of contours delimiting geographical entities of different nature and attributing to each of these entities a value type of contour VTC varying increasingly between a low level, referenced hereinbelow as V27 having low marketing interest, and a high level referenced hereinbelow as V1 having strong marketing interest. These entities are thus defined according to an order of values, which is a function of their interest marketing.

| Marketing | VTC | Geographical entity |
|---|---|---|
| 1 | V1 | Built-up areas > 544K inhab./km$^2$ |
| 2 | V17 | First crown |
| 3 | V2 | Built-up areas > 10K inhab./km$^2$ in first crowns |
| 4 | V3 | Built-up areas and communes > 2K inhab./'km$^2$ in first crowns |
| 5 | V4 | Built-up areas > 200K inhab./km$^2$ |
| 6 | V18 | First crown |
| 7 | VS | Built-up areas > 10K inhab./km$^2$ in first crowns |
| 8 | V6 | Built-up areas and communes > 2K inhab./km$^2$ in first crowns |
| 9 | V7 | Built-up areas > 100K inhab./km$^2$ |
| 10 | V19 | First crown |
| 11 | V8 | Built-up areas > 10K inhab./km$^2$ in first crowns |
| 22 | V9 | Built-up areas and communes > 2K inhab./km$^2$ in first crowns |
| 13 | V10 | Built-up areas > 54K inhab./km$^2$ |
| 14 | V20 | First crown |
| 15 | V11 | Built-up areas > 10K inhab./km$^2$ in first crowns |
| 16 | V12 | Built-up areas and communes > 2K inhab./km$^2$ in first crowns |
| 17 | V13 | Built-up areas > 20K inhab./km$^2$ |
| 18 | V14 | Built-up areas > 10K inhab./km$^2$ |
| 19 | V16 | Acceptance zones > 500 secondary residences |
| 20 | V15 | Built-up areas and communes > 2K inhab./km$^2$ |
| 21 | V21 | Axes > 8440 vehicles/day |
| 22 | V22 | Axes > 4000 v/d |
| 23 | V25 | Towns > 1K inhab./km$^2$ |
| 24 | V23 | Axes > 2000 v/d |
| 25 | V24 | Coastal region of 10 km |
| 26 | V26 | Non-mountainous, non-forested remainder |
| 27 | V27 | Remainder |

In a third embodiment of the invention, the weighting can be identical for all cells, a single progress coefficient thus being utilised. The progress coefficient can be quite simply entered by the user as one of the entry parameters in a variant embodiment The process according to the present invention consists of utilising (53) the data representative of the progress of traffic to generate a map (31) of the target traffic to flow. The calculation means (12) of the system (1) enabling the traffic distribution map (30) to be coupled with the traffic progress data originating from geomarketing information. The resulting map (31) is displayed by way of display means of the interactive device (3) and allows the zones for which the traffic density is going to increase to be viewed.

In an embodiment of the invention, a modelling phase of the radio coverage (61) is parametered by means of data representative of at least one type of radio station. This phase comprises the recovery, using the selection means (12), of data and determination parameters (60) of the map of radio coverage corresponding to the previously selected geographical map. The information system (1) takes into account a probability of overlapping between cells. These data and parameters are stored in a coverage file (26) of the storage means (2). The parameters comprise especially a step of coverage calculation. Then meshing is performed on the geographical map selected by coverage cells linked to said reference radio coverage map, so as to determine the traffic capacity within each cell. In an embodiment of the invention, a traffic file is created by homogeneously distributing the send/receive equipment in the cells and by defining a set blockage rate. A map of traffic capacity (32) can then be created.

Figure 2:
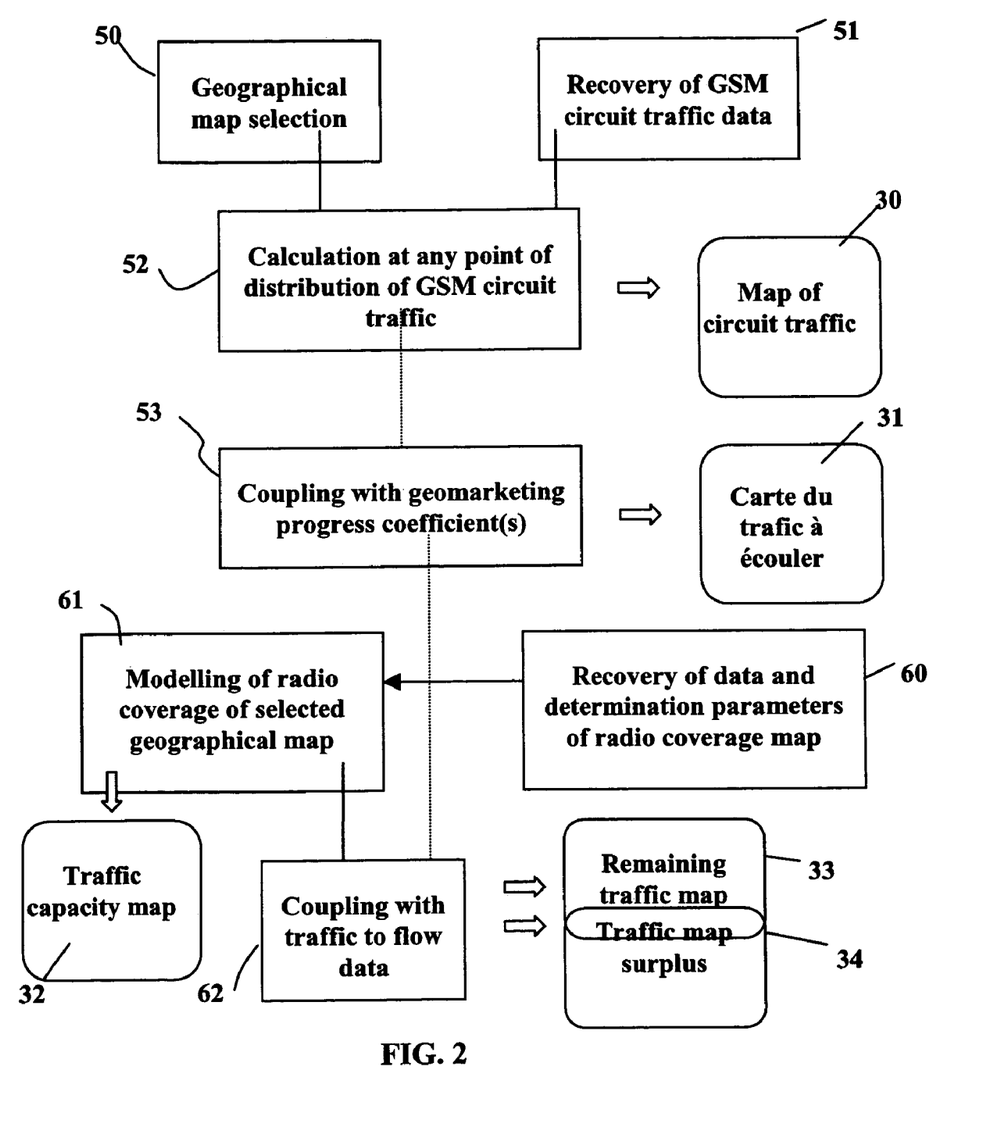
FIG. 2 illustrates one of the processes comprising several stages implemented in the invention for creating and operating traffic distribution maps.

The process according to the invention can advantageously be operated to lead to an identification stage of sub-zones to be compacted. The identification of such sub-zones can be done by the calculation means (11) of said information system (1) as a result of the modeling phase of the radio coverage (61). For this, the calculation means couple (62) data for the traffic to flow with the modeled coverage data and for each pixel (301, 302, 303) compare for example the traffic to flow value and the traffic capacity of the network. As schematically illustrated in FIG. 2, it is accordingly possible to easily create a map of remaining traffic (33), by attributing to each pixel displayed by means of display means of the interface device (3) a value representative of remaining traffic for the geographical point represented by the pixel. As a variant, the identification stage of network sub-zones to be compacted can also be done for each contour defined by the marketing, by comparison between the traffic to flow and the traffic capacity. In an embodiment of the invention, the system (1) can allow these sub-zones to be delimited as a function of a threshold of positive difference determined between traffic to flow and traffic capacity. These sub-zones thus identified correspond to a sub-dimensioning of the network, which must be taken into account for definition of the target network.

Similarly, the process according to the invention can be operated advantageously to lead to an identification stage of subzones in excess of capacity. A map (34) of traffic capacity surplus can thus be produced to visualise on display means of the interactive device (3) all the sites where the network is oversized relative to the real traffic demand. In an embodiment of the invention, identification of these zones can be facilitated by use of a different graphic representation, for example an increased level of colour. On a surplus traffic map (34), the under-sized zones appear for example in white and the over-sized zones appear all the better since the difference between capacity of the network and the traffic to flow is heightened. In a variant, the comparison can be made for each contour between the traffic to flow and the traffic capacity. The difference obtained between traffic to flow and traffic capacity must for example exceed a set threshold within the contours thus identified as a sub-zone of under-sizing. The same can apply for identifying sub-zones of over-sizing. In an embodiment, the calculation means (11) of the system (1) will be able to include a comparison module of values between the traffic to flow and the traffic capacity, at any point on a map selected by said selection means, to allow such sub-zones to be determined. The utilisation of a high threshold of this difference for determining the under-sizing zones, respectively of a low threshold of negative value for determining the over-sizing zones, can naturally be envisaged. Such thresholds are for example parametrable by the user and are stored in the configuration file. With thresholds of different amplitude, it is thus possible to operate such maps to act on the send/receive equipment. The difference between traffic flow and traffic capacity in a sub-zone localised essentially on a cell is for example reduced by adjustment, addition or omission by the user of at least some send/receive equipment located in this cell. More generally, this action can concern at least one piece of send/receive equipment of the highest-performing cell, known as main server, for said sub-zone. Such manipulation of the radio resource is particularly easy with the information system (1) according to the invention. The changes made can release automatically reconfiguration of the simulation of the network on the system (1) and storage of these changes in the storage means (2).

It is therefore understood that the invention contributes to reliably locating the zones, current and future, sources of black spots as well as the zones difficult to service on the capacity plane. Exploiting traffic maps guarantees good quality service at the least cost since the different sites and equipment constituting the radio resource will be able to be optimised both qualitatively and quantitatively at the same time.

One of the advantages of the invention is to provide a database which can be used directly. The invention offers the possibility of easily detecting the "holes" in the sizing relative to traffic to flow, and tracking at an increased failure/cut rate.

Another of the advantages of the invention is to facilitate adjustment of the configurations of the coverage senders/receivers as a function of the way in which the traffic evolves. The invention provides a decision-making tool, on a cellular scale, without the necessity then of carrying out ulterior weighting. By means of a traffic distribution map (30) circuit GSM or data traffic and knowing the desired service quality, it is simply a matter of calculating a number of senders/receivers (TRX) to be installed for the cells. The aim of the invention is thus to satisfy the coverage needs of a network of any type, such as GSM, UMTS, etc.

It is particularly advantageous to exploit a traffic distribution map (30) independent of the radiocommunications system being used and of the corresponding cellular network, which allows the traffic to be provided efficaciously when the system is changed. Thus, according to the process of the invention, it is possible to utilise the analogue traffic data to estimate the GSM traffic and utilise the GSM traffic data to provide the traffic on the UMTS network cells.

It must be evident for persons skilled in the art that the present invention allows embodiments in numerous other specific forms without departing from the application domain of the invention as claimed. As a consequence, the present embodiments must be considered by way of is illustration, but can be modified within the scope defined by the range of the attached claims, and the invention does not have to be limited to the details given hereinabove.

The invention claimed is:

1. A process for creating, administering and operating traffic distribution maps of a mobile radiocommunications network, for deployment of radio coverage telephone network, using an information system storing data representative of geographical zones cut up into a plurality of points or pixels according to the cutting of said network, of the data representative of the traffic in the radiocommunications network of subscribers to said network, wherein said data representative of the traffic in the radiocommunications network comprise quantitative and qualitative measurements of the traffic to the subscribers on the network, said measurements corresponding to at least one set time slot, said process comprising the following steps:

selection of at least one geographic zone by interactive means between the user and said system;

recovery and utilization by said system of data representative of the traffic corresponding to said selected geographical zone and to a set time slot to form, by operating these data by the information system, at least one traffic distribution map of the radiocommunications network, wherein data representative of the traffic in the radiocommunications network comprise data supplied by counter means and extracted from at least one supervision centre of equipment (OMC) by extraction and tabling means of said information system, and wherein each geographical zone stored in the information system corresponds to a plurality of series of quantitative and qualitative measurements of the traffic, each series of measurements corresponding to a different time slot, the sequencing of said series of measurements as a function of the geographical zones and the time slots being carried out by said extraction and tabling means in respective specific tables stored in a memory of the information system.

2. The process according to claim 1, wherein said data representative of the traffic comprise the availability of the frequency range for each geographical zone, said quantitative and qualitative measurements of subscribers traffic comprising especially, for each geographical zone, for a set time slot:

the average density of the traffic flow (dmte) at any point in the zone, the access blockage rate to the network (tbar) at any point in said zone.

3. The process according to claim 2, wherein said quantitative and qualitative measurements of subscriber traffic further comprise, for each geographical zone, for a set time slot, the number of call starts (nda) at any point in the zone.

4. The process according to claim 1, wherein said information system calculates a level of value of the subscriber traffic (nvt) at any point of the selected geographical zone, said level of traffic value (nvt) being expressed in a traffic unit representative of the occupancy rate of radio resources, the pixels being represented in said zone differently according to the level of value of the traffic flow for the pixel.

5. The process according to claim 1, wherein a distribution map of the radiocommunications network traffic stored by said information system is coupled, in response to a selection made by interactive means between the user and said system, to a first database stored in said system which comprises data representative of the estimated progress of the traffic inside each of the pixels, said system selecting in said first database those data corresponding to said traffic distribution map selected to calculate, by calculation means of said system, the traffic to low inside each of the pixels.

6. The process according to claim 5, wherein data representative of the estimated progress of the traffic corresponds for each pixel to a weighting function especially of service probabilities connected to the field level in the network, and the type of ground station, the information system having an effect on and storing this weighting for each pixel.

7. The process according to claim 1, wherein a distribution map of traffic stored by said information system is coupled, in response to a selection made by interactive means between the user and said system, to a second database stored in said system which comprises geomarketing data representative of geographical maps for weighting pixels combined into contours, the weighting coefficient within the contours depending especially on service probabilities, functions of the field level in the network, and the type of ground station.

8. The process according to claim 5, wherein a map of the traffic to flow is generated by the calculation means from operating and coupling data of the traffic distribution map with the traffic progress data stored in a database (24) of the storage means.

9. The process according to claim 8, wherein a modeling phase of the radio coverage is parametered using data stored in the system, representative of at least one type of radio station and comprises the following stages which apply to the previously selected geographical zone:

selection of data and parameters for determining the zone of radio coverage corresponding in a coverage file of the storage means of said system, said parameters comprising a coverage calculation step.

Meshing on said geographical zone selected from the coverage cells associated with said zone of radio coverage, so as to determine the traffic capacity within each cell.

10. The process according to claim 9, wherein the identification stage of sub-zones to be compacted is made by the calculation means of said information system as a result of the modeling phase of the radio coverage, by comparison for each pixel between the traffic data flow and the data representative of the traffic capacity.

11. The process according to claim 9, wherein an identification stage of network sub-zones to be compacted is made by the calculation means of said information system as a result of the modeling phase of the radio coverage, by comparison for each contour between the traffic to flow and the traffic capacity, the difference between traffic to flow and traffic capacity exceeding a threshold set inside said sub-zone.

12. The process according to claim 9, wherein an identification stage of sub-zones of excess capacity is made by the calculation means of said information system as a result of the modeling phase of the radio coverage, by comparison for each pixel between the traffic to flow and the traffic capacity.

13. The process according to claim 10, wherein the difference between traffic flow and traffic capacity in a sub-zone is reduced by adjustment, addition or omission by the user of at least one piece of send/receive equipment located in the highest-performing cell, so-called main server, for said sub-zone, triggering reconfiguration of the modeling of the network on the information system and storage of the corresponding modification.

14. An information system for implementing the process according to claim 1, comprising storage means, selection means and calculation means, said storage means comprising in a first memory data representative of geographical zones cut up into a plurality of points or pixels according to the way said network is cut up and in a second memory data representative of the traffic of a radiocommunications network with at least one set time slot for said network, wherein said system comprises:

interactive means between the user and said system, connected to the selection means for selecting and displaying at least one of said geographical zones, superposition means on said selected geographical zone of data representative of the traffic with a set time slot for forming at least one traffic distribution map, displayed by said interactive means, extraction and tabling means, from data provided by counter means and extracted from at least one supervision centre for equipment (OMC), series of measurements as a function of the geographical zones and the time slots.

15. The information system of claim 14, wherein said data representative of the traffic comprise the availability of the frequency range, quantitative and qualitative measurements of the subscriber traffic, said measurements including:

the average density of traffic (dmte) at any point of the zone, the blockage rate of access to the network (tbar) at any point in said zone, the number of call starts (nda) at any point of the zone.

16. The information system of claim 14, wherein said calculation means are connected to the storage means for calculating, from said data representative of the traffic, the value of the traffic flow at any point in a geographical zone selected by said selection means.

17. The information system of claim 14, wherein said storage means comprise memories for storing respectively at least one file containing geomarketing data, at least one file containing data for determining the radio coverage of the network, at least one file of data representative of the estimated progress of the traffic at any point or pixel of the network, and at least one configuration file comprising entry parameters acquired by the user by means of said interactive means, said geomarketing data comprising weighting elements of each of the pixels, especially service probabilities functions of the field level in the network, and different types of ground station.

18. The information system of claim 17, wherein said calculation means are connected to extraction means of the data of the file of marketing data and/or of the file of progress data on the traffic for calculating at any point of said selected zone the value of the traffic to flow, all the values of traffic to flow of the selected zone being stored in said storage means.

19. The information system of claim 18, wherein said determination data of the network radio coverage comprise data representative of at least one type of station radio, said selection means selecting those data representative of radio coverage zones and said entry parameters corresponding to the zone selected to allow the calculation means to provide the traffic capacity at any point in said zone.

20. The information system of claim 19, wherein said calculation means comprise a comparison module of the values between the traffic to flow and the traffic capacity, at any point in a zone selected by said selection means, allowing the network sub-zones to be compacted to be determined.

21. The information system of claim 17, wherein said entry parameters acquired by means of a user/system interface of the interactive means comprise a step of coverage calculation.

* * * * *